Jan. 2, 1951

H. F. ROST ET AL

SUBAQUEOUS SOUND TRANSMISSION SYSTEM FOR OBJECT DETECTION 2,536,771

Filed Oct. 15, 1940

3 Sheets-Sheet 1

Helge Fabian Rost
Per Harry Elias Claesson
INVENTORS
By Otto Munk
their ATTY.

Helge Fabian Rost
Per Harry Elias Claesson
INVENTORS
By Otto Munk
their ATTY.

Helge Fabian Rost
Per Harry Elias Claesson
INVENTORS
By Otto Munk
their ATT'Y.

UNITED STATES PATENT OFFICE 2,536,771

SUBAQUEOUS SOUND TRANSMISSION SYSTEM FOR OBJECT DETECTION

Helge Fabian Rost, Djursholm, and Per Harry Elias Claesson, Jakobsberg, Sweden

Application October 15, 1940, Serial No. 361,226
In Sweden November 21, 1939

5 Claims. (Cl. 177—386)

The present invention relates generally to a subaqueous sound transmission system.

The invention is particularly suitable on board ships for the simultaneous indication of directions and distances of invisible submarine objects and obstacles, such as submerged icebergs, anchored invisible and floating mines, submarines, reefs, wrecks and the like, that are dangerous to all surface crafts, due to the fact that said objects and obstacles are invisible and their position not known to said crafts.

The invention is further suitable for subaqueous communication between submerged crafts or between a submerged craft and a ship on the surface or between a fixed station at the shore and a submarine or surface craft by code signals or by voice.

In the case of communication between two stations of which one or both are movable, the invention fulfills the double purpose of primarily locating the station with which communication is desired and when the stations are located, directional communication by signals or by voice can take place.

The devices according to the invention can also be used to receive signals or locate ultrasonic waves from subaqueous beacons during fog so that a ship can locate its position with respect to one or more such beacons.

We know that various subaqueous signaling systems are known such as telephone or signal communication between two ships or between a surface ship and a submarine, the echo method of acoustic sea depth finding, direction finding of subaqueous sound sources, for example sounds from passing ships, etc. Some systems, however, only determine the direction of the sound, while others determine the distance only by emitting certain interrupted signals which are reflected by the sea bottom or by another craft and the distance is calculated or registered on a chart.

In subaqueous telephony amplitude modulation is known whereby a quartz crystal transmitter and receiver have been used. Very great voltages are, however, needed for modulation and difficulties have besides been experienced in obtaining sufficiently low frequencies in piezoelectric oscillators, as said oscillators normally vibrate at extremely high and fixed frequencies not suitable for subaqueous transmission. Due to these inconveniences subaqueous telephone or communication systems have not been used to any great extent.

The present invention enables the exact directions and distances of invisible subaqueous objects to be immediately and automatically indicated or observed, as if the objects were really seen.

In systems used heretofore several transmitters and receivers fixed to the bottom of the ship have been used for directional transmission and reception. This multiplication of transmitters and receivers to obtain a directional wave is very expensive. Other systems use transmitters and receivers fixed to the bottom of the ship for measuring distance in a fixed direction by the echo-method. Still others use a receiver normally turnable around a vertical shaft for determination of exact direction of a received wave.

In a transmission system according to the present invention there are provided means to transmit signal waves of varying frequency from an origin, means at the origin to receive echos of said transmitted waves reflected from a distant body, at least one of said means being directional and rotatable about a given axis at said origin, means for producing rotation of said rotatable means about said axis, means for combining said received waves with waves transmitted from the origin to produce a beat wave of a frequency proportional to the distance to said reflecting body from said origin, an indicator having a circular indicating area, and means controlled by said received beat wave for producing a localized indication within said area, said indication producing means including means for rotating the angular position of said localized indication about the center of said area and in synchronism with the rotation of said rotatable means together with the frequency sensitive means controlled by said beat wave for fixing the radial distance of said localized indication from the center of said indicating area in accordance with the frequency of said beat wave.

The present transmission system differs from all other signal-systems by the fact that the localization of objects can be done automatically and simultaneously without manual operation.

In a subaqueous transmission system we preferably use transmitter and receiver elements of the magnetostrictive type with core of broad frequency resonance curves. Such core can be made of soft nickel or alloys of nickel and iron, for example 92% Ni and 8% Fe, or alloys of cobalt and steel, for example 40% cobalt and 60% steel.

We also preferably use one or more parabolic reflectors in the focuses of which transmitters and receivers are located.

According to a feature of the invention the transmitter and the receiver are attached to parallel shafts, rotating with constant speeds, the shaft of the receiver rotating with a speed superior to that of the transmitter.

According to another feature of the invention the system can be provided with two transmitters and/or receivers, for example for scanning in horizontal direction. The two transmitters are thereby located 180° apart and arranged to be connected one after another during 180° forward scanning. By this arrangement the scanning time can be reduced to half, unless the shaft is given a forth and back rotating motion for scanning, for example ahead of a moving ship, in which case only one transmitter and one receiver is needed.

Scanning can further be done in any plane between the horizontal and the vertical planes for locating obstacles or mines on the sea bottom or deep below the keels of the ships.

According to another feature of the invention the system can be used for communication between two ships, on the surface and/or submerged, whereby each ship uses its transmitter and/or receiver for scanning and locating the other ship. As soon as the positions of respective ships have been located the rotation of the transmitters and the receivers is automatically stopped upon the receipt of a direct or reflected wave from the other station, the respective transmitter being further provided with means to be afterwards moved synchronically with the receiver, said transmitter and receiver being adapted to be directed towards the receiver and transmitter of the other station.

The voice can then be either frequency or amplitude modulated on the pressure wave, although frequency modulation is preferred.

According to a preferred feature of the invention a simultaneous indication of direction and distance of a subaqueous object with respect to the point of observation, for example a ship, can be registered at said point of observation or on board the ship, for example, on a fluorescent screen of a cathode ray tube.

A ship equipped with an installation according to the present invention can use the same also for receiving subaqueous sound signals from fixed beacons for warning ships during fog and mist. The direction of such beacons can be immediately and precisely registered on a fluorescent screen, and if two signals from two different beacons are received simultaneously, the directions of both beacons can be registered with respect to the ship and the exact position of the ship therefrom be located on the chart.

Our invention will be further understood from the following description when read in connection with the accompanying drawings of which:

Figures 1, 2:
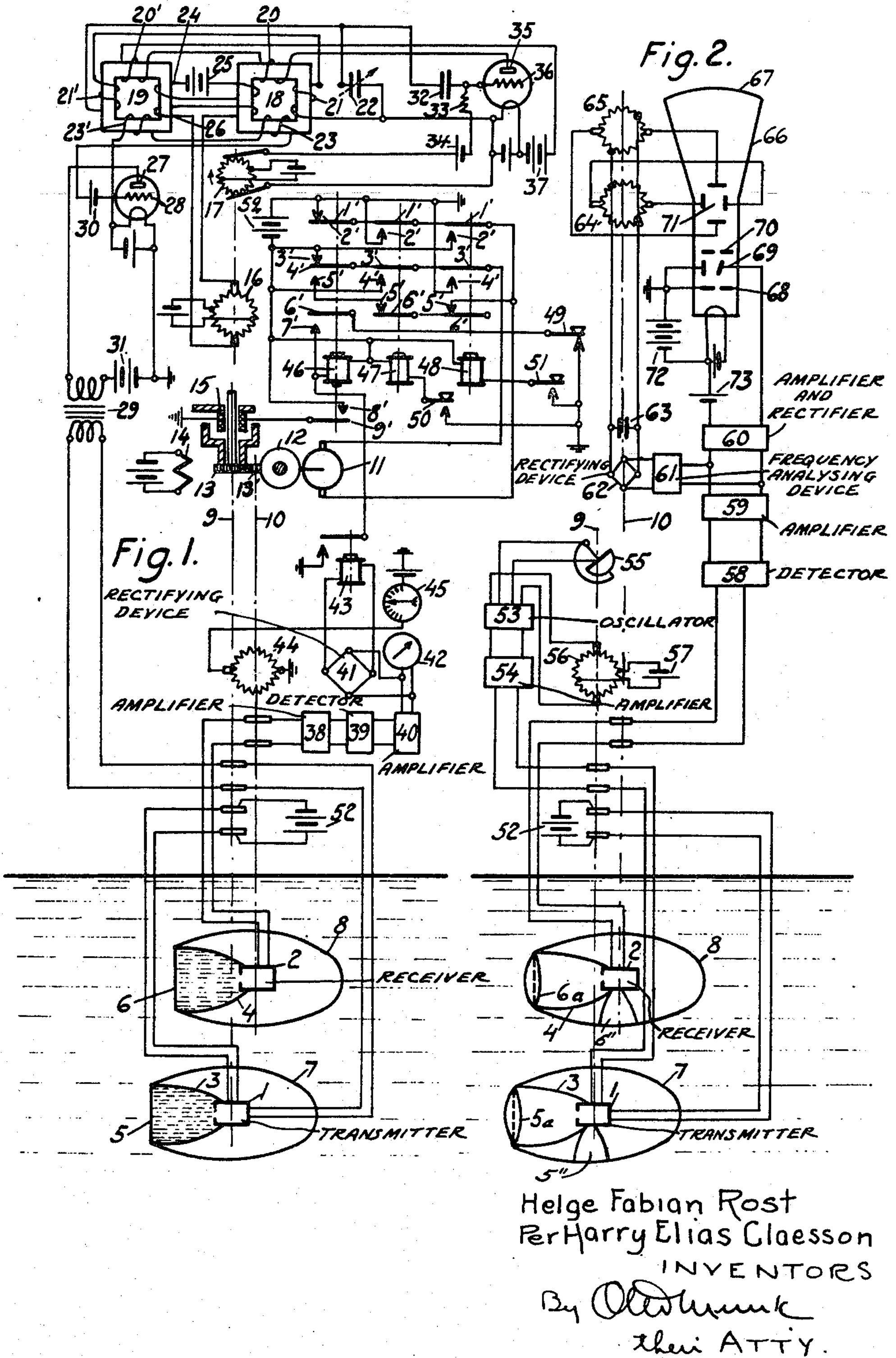
Fig. 1 shows one form of embodiment of transmitting and receiving arrangements according to the invention, the indicating apparatus for the direction and the distance of invisible subaqueous objects being represented diagrammatically by two adjacent meters.
Fig. 2 shows an embodiment of the invention according to which the directions and the distances of invisible objects are directly indicated on a fluorescent screen.

In Fig. 1, 1 and 2 are transmitter and receiver on separate shafts, 9 and 10 respectively. The transmitter and the receiver are provided with reflectors 3 and 4. The reflectors are filled with a fluid, preferably oil, in contact with the diaphragms 5 and 6, which separate the said fluid from the outside water. 7 and 8 are streamlined shells of for example circular or other suitable form to facilitate rotation of the transmitter and the receiver in the water, said shells enclosing the transmitter and the receiver and rotating together with same. 11 is a motor driving both shafts by suitable gearing 12—13′—13, so arranged that shaft 10 carrying the receiver rotates considerably faster than shaft 9, which carries the transmitter, so that the receiver can scan a plurality of times while the transmitter makes one turn. 14 is a field coil with current source for the motor 11. 15 is a solenoid coil of an electromagnet arranged around the shaft 9 for disengaging same from shaft 10 and, if desired, to couple the shafts to move synchronously, so that the transmitter and receiver can rotate synchronously and, if desired, can transmit and receive in the same direction. 16 is a potentiometer with coupled current source. The potentiometer can be centrally arranged with respect to a rotary shaft carrying collector brushes and making contact with said potentiometer, or the potentiometer can be arranged to rotate with said shaft, the brushes in such a case being fixed. Potentiometer 16 is connected to windings 26 of two transformers to change the inductance of said windings in order to vary the permeability of the magnetic circuit and thereby also the frequency of the oscillator circuit which shortly will be described. 17 is a similar potentiometer arranged in a manner similar to that of potentiometer 16 and arranged on the same special shaft.

A magnetostrictive oscillator generally operates at great amplitudes near the top of its resonance curve, but, when at constant input of electrical energy to the magnetostrictive oscillator, the frequency moves to one or the other side of the said top, the amplitudes of the oscillations of the said oscillator become smaller. It is however desirable in the present embodiment of the invention that the pressure waves should be of substantially the same strength within the frequency range.

For this reason potentiometer 17 has been introduced for adjusting the energy in the output stage. Potentiometer 17 should be so adjusted, that maximum negative grid potential is delivered to oscillator 35—36 and thus the least degree of amplification at the resonance curve top of the magnetostrictive oscillator 1, and that a successively lowered negative grid potential at either side of the top of the resonance curve is delivered, so that a corresponding increase of the output of the magnetostrictive oscillator is obtained. By this arrangement a constant power output is obtained for both the oscillator and the magnetostriction transmitter with respect to the frequency region desired. 18 and 19 are two transformers provided with series-coupled windings 20—20' connected in series with the anode 35 and battery source 37. 21—21' are windings connected in series with condenser 32 and grid 36. Parallel to said windings 21—21' is placed a condenser 22, which can be made variable for varying the frequency of the oscillator. In this case the potentiometer 16 should be superfluous. If a variable condenser 22 is used, it can be operated by the same shaft as that of which potentiometer 17 is shown to be arranged. 23—23' are transformer windings connected to the grid circuit of output amplier 27—28. 24 are transformer windings in series with a direct current source 25 for pre-magnetisation of cores of said transformers in order to give same a certain predetermined permeability level. 27 is the anode and 28 is the grid of the said output-amplifier. 29 is an output transformer connected to the transmitter 1 by means of collector rings on the shaft 9. 30 is a negative grid battery connected to grid 28 of output amplifier. 31 is an anode battery source. 33 is a grid leak of oscillator 35—36 and 34 is a negative grid potential of said oscillator, which potential sometimes is connected in series with battery source of potentiometer 17 and sometimes opposed to said battery source to regulate the effect of the oscillator to maintain the constant power output of the magnetostrictive transmitter as previously mentioned. 38 is a high frequency amplier. 39 is a detector. 40 is an amplifier. 41 is a rectifier device. 43 is a relay to be operated upon the receipt of a beat frequency signal. 42 is a frequency meter, indicating the distance to a located object. 44 is a variable resistor fixed on shaft 10 of receiver 2. 45 is a galvanometer to indicate the direction of the located object.

46 is a relay which operates as soon as relay 43 is operated. The object of relay 46 is to close circuit of solenoid coil 15 over contacts 8'—9' to disengage cogwheel 13 of shaft 9 from cogwheel 13' of shaft 10 and to couple shafts 9 and 10 to run synchronously.

Contacts 1'—2' and 3'—4' of relay 46 are interrupted upon operation of relay 46, interrupting current of motor 11. At the same time contact 4'—5' is closed, so that motor 11 is short-circuited.

The motor 11 is thus made to stop as soon as relay 43 is operated upon the receipt of an incoming signal. As soon as relay 46 is operated, it obtains holding current over its contact 6'—7' and button 49.

The motor can be made to move by pressing button 50, until a clear indication of distance and direction of an object on meters 42 and 45 has been obtained.

Should it be desired to run the motor 11 backwards, button 51 should be pressed, whereby motor 11 is connected to opposite poles of battery 52, thereby making it run in a direction contrary to previous scanning.

If several objects or obstacles exist in front of a craft, they can all be located one after another by causing the motor slowly and simultaneously to rotate the transmitter and receiver around once. When ordinary automatic scanning again is desired, button 49 should be lifted, thereby interrupting holding current of relays 46 and 15 to release same whereby the transmitter and the receiver will again continue scanning independently of each other, until a new object is encountered.

In Fig. 2 similar parts have same numbers as in Fig. 1. Instead of plane diaphragms 5 and 6 shown in Fig. 1 said diaphragms have been shown in Fig. 2 in the form of lenses 5a and 6a respectively for concentrating the supersonic waves emitted and received. As a general rule the diameter of a diaphragm or of a lens shall be large with respect to the wave-length of the transmitted or received wave in order to obtain a sharply directional wave. The material of the diaphragm shall further be of about the same density or specific gravity as the surrounding liquid or liquids in order to avoid reflection. According to this rule diaphragms or lenses can be made of any suitable synthetic resin of sufficient strength, for example polystyrol (density 1.05), a polymerized acrylic acid ester (density 1.18) or the like. The thickness of a diaphragm or wall through which the sound wave shall travel, shall further preferably be an integral multiple of one-half wavelength of the transmitted wave in the diaphragm or wall itself. If this requisite is fulfilled, the sound wave passes the wall with a minimum of loss of energy. The wave resistance of a certain medium is proportional to the product of the density and the wave velocity of said medium. The loss of energy is smallest, when a wave passes from one medium to another, if the wave resistance, as above defined, is about equal for both mediums. The mediums in the present invention should therefore preferably be chosen so that a minimum of absorption or reflection is experienced upon the passing of a wave from one medium to another.

In Fig. 2, 52 is a direct current source for pre-magnetisation of the core of the magnetostrictive transmitter 1. 53 is an oscillator and 54 is an amplifier. For the frequency modulation variable condenser 55 or potentiometer 56, associated with shaft 9, can be used. 57 is a direct current source, associated with potentiometer 56. 58 is a detector. 59 is an amplifier. 60 is an amplifier and rectifier. 61 is a frequency analyzing device so arranged that the outgoing current is proportional to the beat frequency between a transmitted and received reflected wave. An example of such a frequency analyzing device is described in an article entitled "A direct reading frequency meter for high speed recording," published in Review of Scientific Instruments," February 1935, vol. 6, pages 43-45. 62 is a rectifying device and 63 is an energy storing device in the form of a condenser. 64 and 65 are potentiometers rotating with shaft 10 and serving to direct the cathode ray of oscillograph 66 synchronously with the scanning direction of receiver 2 by means of cathode ray reflecting electrodes 71. 73 is a current source to supply negative potential to the electrodes 69 to cause the beam to strike the diaphragm 70 instead of proceeding along the axis through said diaphragm. 72 is an anode current source. 67 is the fluorescent screen of the cathode ray oscillograph on which the direction and distance of scanned objects can be directly observed.

The device shown in Fig. 2 operates in the following manner. The frequency modulated waves transmitted by transmitter 1 are received by receiver 2 in part directly and in part reflected from an obstacle and passed to the detector 58, which allows the resulting beat frequency to pass, proportional to the distance that the transmitted wave has travelled to the object and back. After the beat frequency has been amplified in amplifier 59 the current is divided into two paths. One part of the beat frequency current is thus directed over amplifier and rectifier 60 to the electrodes 69 of cathode ray oscillograph 66, while the other part of the beat frequency current is directed through the frequency analyzing device 61.

The current through rectifying device 62 depends on the beat frequency so that indicating currents of varying frequencies are registered proportionately. Since the average current in the corresponding indicating instrument is directly proportional to the number of pulses delivered per second, it follows that the current is proportional to the frequency of the input signal.

After passing the rectifying device 62 the current is passed through rotating potentiometers 64 and 65 which rotate synchronously with the receiver. The said potentiometers are connected by means of brushes to deflecting plates 71 of the cathode ray oscillograph 66 in known way. By this arrangement of the rotating potentiometers, it is obtained that the electron ray of the oscillograph will always show the exact direction of a reflecting obstacle on the fluorescent screen 67. At the same time the degree of the deflection of the ray will simultaneously indicate the distance to the obstacle in view of the fact that the magnitude of the output of rectifying device 62 is proportional to the said frequency which in its turn is proportional to the time that the transmitted and reflected wave takes to travel from the transmitter to the object and back again. The part of the beat frequency current that passes through amplifier and rectifier 60 serves to neutralize the normal negative voltage on the electrodes 69 so as to straighten the cathode ray and make it pass through the hole of the diaphragm 70.

The beat frequency in the present supersonic frequency modulating system is dependent on the distance to the object, on the extent of the frequency modulation and on the number of frequency modulation sweeps per second.

The following example will explain the problem of frequency modulation of supersonic pressure waves.

Suppose that the scanning angle of the emitted wave beam is 12°. The receiver shall therefore rotate $$\frac{360}{12}=30 \text{ times}$$

for each turn of the transmitter in order to be able to receive reflected waves from any sector of the compass.

If the receiver rotates 4 turns per second, the transmitter shall rotate only 1 turn in 7.5 seconds. At a distance of 1000 meters from the transmitter, the transmitting beam scans over a sector of about 200 meters simultaneously.

Anchored or floating mines and small objects should reflect sufficient energy to make them noticeable at about 500 meters from a craft. If directed sound waves are supposed to decrease in intensity in water proportionally to the distance, an object of 20 times as big a surface should be registered at a distance of 10,000 meters. A transmitted wave corresponding to a certain frequency modulation sweep should not be allowed to mix with waves reflected from a far away object and corresponding to waves transmitted during a previous frequency modulation sweep. The frequency modulation sweep should therefore take place during a sufficient length of time, so that a transmitted wave, which is reflected by a far away object shall be so weak that an indication of such an echo will not be possible. The distance to such a far away object may be for example 50,000 meters, for which distance the sweep time will be about $$\frac{50{,}000\cdot 2}{1{,}500}=66 \text{ seconds}$$

Figure 3:
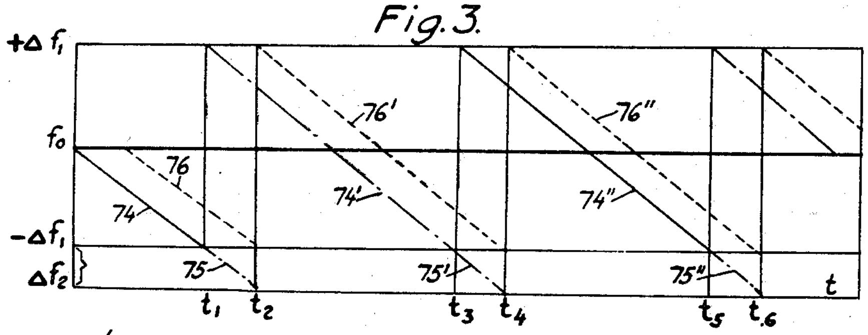
Fig. 3 shows frequency curves and time intervals between transmitted and received reflected frequency modulated waves.

If a linear frequency modulation like that shown in Fig. 3 is used for each revolution of the transmitter and if a pressure wave 74 returns between times $t_1$ and $t_2$, there will be no transmitted frequency for mixing purposes.

The reflected wave 76 could only be beaten together with the newly emitted wave 74' of higher frequency $f_0+\Delta f_1$, which begins emitting at $t_1$.

If the reflected wave 76 between times $t_1$ and $t_2$ were beaten together with said newly emitted wave, however, the beat frequency would be so high that the indication of a corresponding long distance would immediately be understood to be erroneous.

If a wave frequency of 60,000 cycles per second is modulated from 65,000 to 55,000 cycles in each sweep of 66 seconds, we obtain a change of frequency of $$\frac{10{,}000}{66}=150 \text{ cycles per second}$$

If an object is located at a distance of 1000 meters the time for a wave to travel back and forth is $$\frac{2\times 1{,}000}{1500}=1.34 \text{ seconds}$$

The beat frequency is then 150 times 1.34=200 cycles per second. If the object is located at a distance of 10,000 meters the time for a wave back and forth will be 13.4 seconds and the beat frequency 2000 cycles.

Figures 4, 5, 6, 7, 8, 9:
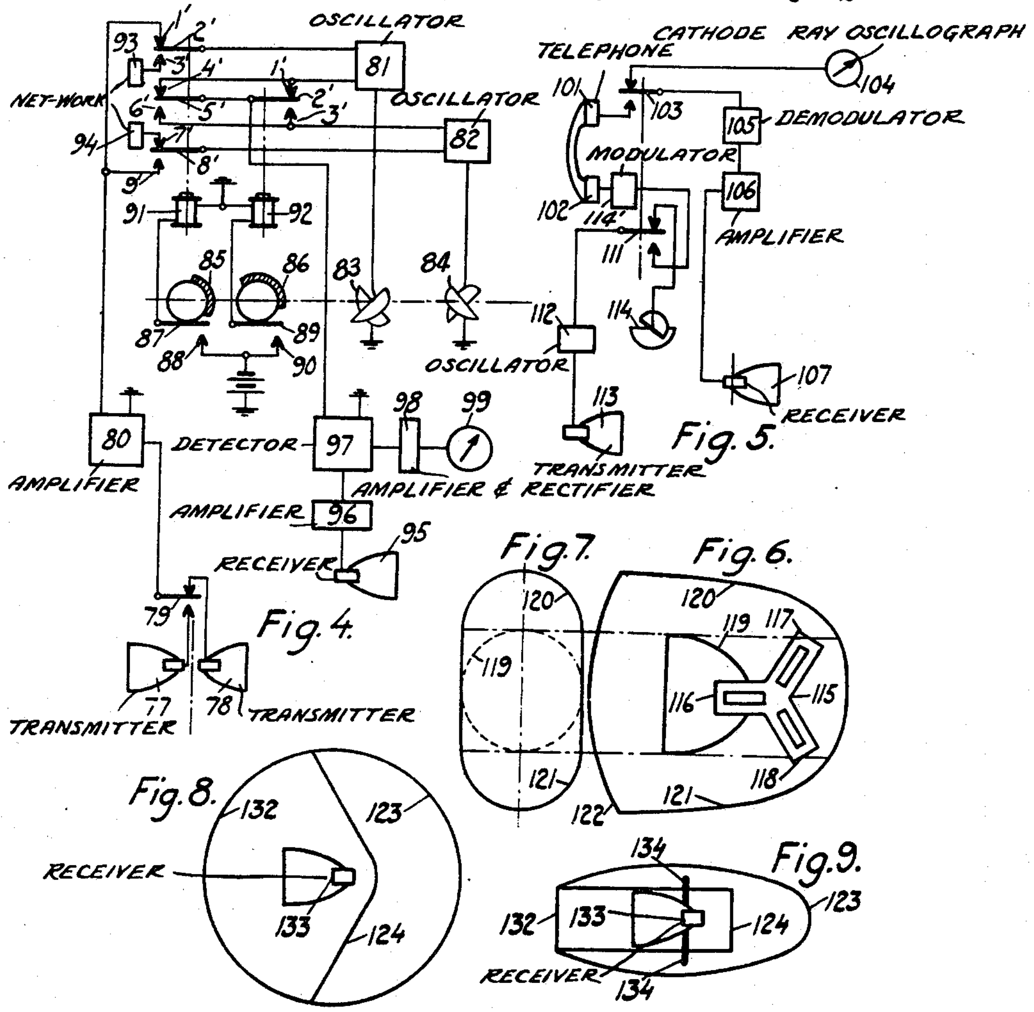
Fig. 4 is an abbreviated diagram showing two frequency modulating oscillators, alternatively to be connected to the transmitter and to the receiver for modulating either the transmitted or the reflected wave in accordance with frequency curves shown in Fig. 3.
Fig. 5 is an abbreviated diagram showing a station provided with frequency modulated transmitter for searching of objects and for telephony.
Fig. 6 shows an example of a special embodiment of a magnetostrictive transmitter provided with double reflectors.
Fig. 7 is a front view of the exterior reflector shown in Fig. 6.
Fig. 8 is a sectional top view of a transmitting or receiving arrangement.
Fig. 9 is a sectional side view of the same arrangement.

In order to compensate for the time intervals $t_2-t_1$, $t_4-t_3$, etc., when the normally emitted wave is being interrupted, said time interval corresponding to periods during which incorrect beat frequencies, due to an hiatus in the frequency variation, occurs, a device according to the invention, as shown in Fig. 4, is resorted to.

According to this device two oscillators are used and which alternatingly are connected to the transmitting and/or receiving means. Oscillators 81 and 82 have, for example, a frequency modulating range from 65,000 to 50,000 cycles.

In Fig. 4, 77 and 78 are transmitters rotating with an angle of 180 degrees between them. By means of a known switching device 79 only one transmitter can be connected at a time during, for example, 180° forward scanning, the other transmitter being disconnected during the same time. 80 is an amplifier. 81 and 82 are two oscillators. 83 and 84 are variable condensers or other known devices synchronously rotatable by a shaft for frequency modulation of respective oscillators. 85 and 86 are insulated cams on discs rotatable by the same shaft by which condensers 83 and 84 are rotatable to close and open contacts 87—88 and 89—90 respectively, at intervals to be afterwards described. 91 and 92 are relays, each one operating a number of contacts, numbered progressively on each relay. It is easier to keep the frequency of a transmitter within a certain frequency range, if its output energy is constant. If the output varies, temperature and voltages at the output vary also, so that not desired frequency variations may occur. In order to prevent such variations networks 93 and 94 are connected during such times, when oscillators 81 and 82 are disconnected from the amplifier 80. 95 is a receiver rotating at a speed superior to that of transmitters 77 and 78. 96 is an amplifier. 97 is a detector. 98 is an amplifier and a rectifier. 99 is an indicating device of distance and direction, for example, like that shown in Fig. 1 or Fig. 2.

The device shown in Fig. 4 operates in the following manner with respect to the frequency modulation curves shown in Fig. 3. Cams 85 and 86 and variable condensers (or potentiometers) 83 and 84 are arranged to be operated on a special shaft which is supposed to make one turn in about 66 seconds or one turn for about every 9th turn of the transmitter shaft. The cams are arranged to alternatively connect oscillator 81 and oscillator 82 to the transmitter and receiver as follows.

In Fig. 3 curves 74, 75 and 74'', 75'' corresponu to oscillator 81, while curves 74', 75' correspond to oscillator 82. Curves 76, 76', 76'' correspond to a reflected curve after a time interval of $t_2-t_1$, $t_4-t_3$ or $t_6-t_5$. The maximum time interval between a transmitted and a received reflected wave should be limited to the greatest distance toi which an object should be registered.

At the time $t_1$ relay 91 is energised, whereby oscillator 81 is disconnected and oscillator 82 is connected to transmitter 78. Oscillator 82 is at the same time connected to the detector 97 and oscillator 81 remains connected to the same detector to cause beat frequencies with reflected waves previously transmitted by oscillator 81 or also with newly transmitted waves from oscillator 82.

At the time $t_2$ relay 92 is energized. Oscillator 81 is then disconnected from detector 97, while oscillator 82 continues connected to transmitter 78.

At the time $t_3$ relay 91 is de-energised. Oscillator 82 is disconnected from transmitter 78, but continues connected to detector 97 for beat frequency generating purposes. Oscillator 81 is again connected to transmitter 78.

At the time $t_4$ relay 92 is also de-energised. Oscillator 82 is disconnected and 81 continues connected to transmitter 78 and is now also connected to detector 97.

At the time $t_5$ relay 91 is energised again in the same manner as at the time $t_1$ and the performance described is repeated again.

The object of this cooperation of the two oscillators 81 and 82 which work synchronously is to make possible a supply to the detector of a wave of the same constant change of frequency modulation during the otherwise dead time intervals $t_2-t_1$, $t_4-t_3$; etc., so that a reflected wave can be beaten together in the detector with a proper wave although this wave is not emitted in the form of a pressure wave.

Fig. 5 is a combined subaqueous searching and telephone system in which 101 is an audio receiver, 102 is a microphone transmitter, 103 and 111 are switches to change the pressure wave transmitter 113 and receiver 107 from searching for objects to telephone communication when respective objects have been located according to Fig. 1, 2, 4 or 11. 104 is a frequency meter or cathode ray oscillograph. 105 is a demodulator for frequency modulated waves. 106 is an amplifier. 112 is a transmitting oscillator, 113 a subaqueous transmitter and 114 a frequency changing device for frequency modulation transmission. 114' is a frequency modulating device to modulate the oscillator 112, when the transmitter 102 is connected to the pressure wave transmitter 113.

When speaking over modulated subaqueous pressure waves, the voice takes some time to arrive from the distant station. Thus at a distance of 1000 meters the voice arrives after 0.7 second and if voice transmission is established at a distance of 10,000 meters the voice train arrives in about 7 seconds. Talking persons therefore have to wait some time until answer can arrive, if transmission takes place over the same wavelength. Different carrier waves can be used in a two-way transmission. For short distances, however, with some practice the same carrying waves can with advantage be used for both scanning and voice transmission.

The subaqueous transmitter or receiver can be constructed like that one shown in Fig. 6 and Fig. 7, in which 115 is a magnetorestrictive core with vibration emitting surfaces 116, 117 and 118. Surface 116 is located in the focus of a paraboloid 119 and surfaces 117 and 118 are each located in the foci of half-paraboloids 120 and 121 respectively.

The magnetostrictive core is fixed in its center so that each leg can swing freely. The length of the core should be calculated and so located that the waves emitted from the surfaces 117 and 118 and reflected shall be in phase with the waves emitted by vibrating surface 116. In such a way both parabolic reflectors 119 and 120—121 will together emit a very powerful common pressure wave sharply directional. 122 is a membrane separating the outside water from the inside oil or insulating fluid, although the transmitter can be directly submerged in water if sufficiently insulated.

The invention can with advantage also be used for acoustic depth finding. Various ranges of depths can be obtained by varying the modulation speed.

Three different ranges for depth finding can be obtained according to this method by locating the same kind of potentiometers or variable condensers, normally used for frequency modulation on shafts running at different speeds. The frequency changing devices normally located on a specially slow running shaft (see potentiometer 16 or variable condenser 22 in Fig. 1) are used for long range scanning and deep sea depth finding. The frequency modulating change obtained on this shaft is about 150 cycles per second.

By arranging removable or interchangeable potentiometers on shaft 9, Fig. 1 (not shown) similar to potentiometers 16 and 17, arranged on the said special slow running shaft shown in Fig. 1, the frequency change can be increased to $150\times9=1350$ cycles per second, as shaft 9 runs 9 times as fast as the special shaft, on which potentiometer 16 is arranged. This range will serve for average depths up to 100 meters.

By placing a third set of frequency modulating means on the receiver shaft 10, Fig. 1 or Fig. 2 a frequency change of 40,500 cycles per second can be obtained. This range serves for very short ranges and shallow waters. Instead of measuring the time difference between a transmitted and received wave which is rather difficult and uncertain a sharp and exact measure up to the shortest depths can always be obtained by the present method.

An extra transmitter 5'' and receiver 6'' can be located in the same shells 7 and 8 respectively, Fig. 2, for sea depth finding. The same oscillating, sending and receiving equipment can be used for all purposes and by means of switches the transmission and reception equipment can be connected to transmitter and receiver 1 and 2 for scanning or talking or to sea depth finding transmitter and receiver pointing downwards. Speech transmission can also be directed to either kind of transmitter and receiver for horizontal or vertical transmission.

Instead of perforating the ship's hull, the transmitter and receiver can be located in the bow of the ship one above the other or at each side of the bow.

Figures 10, 11:
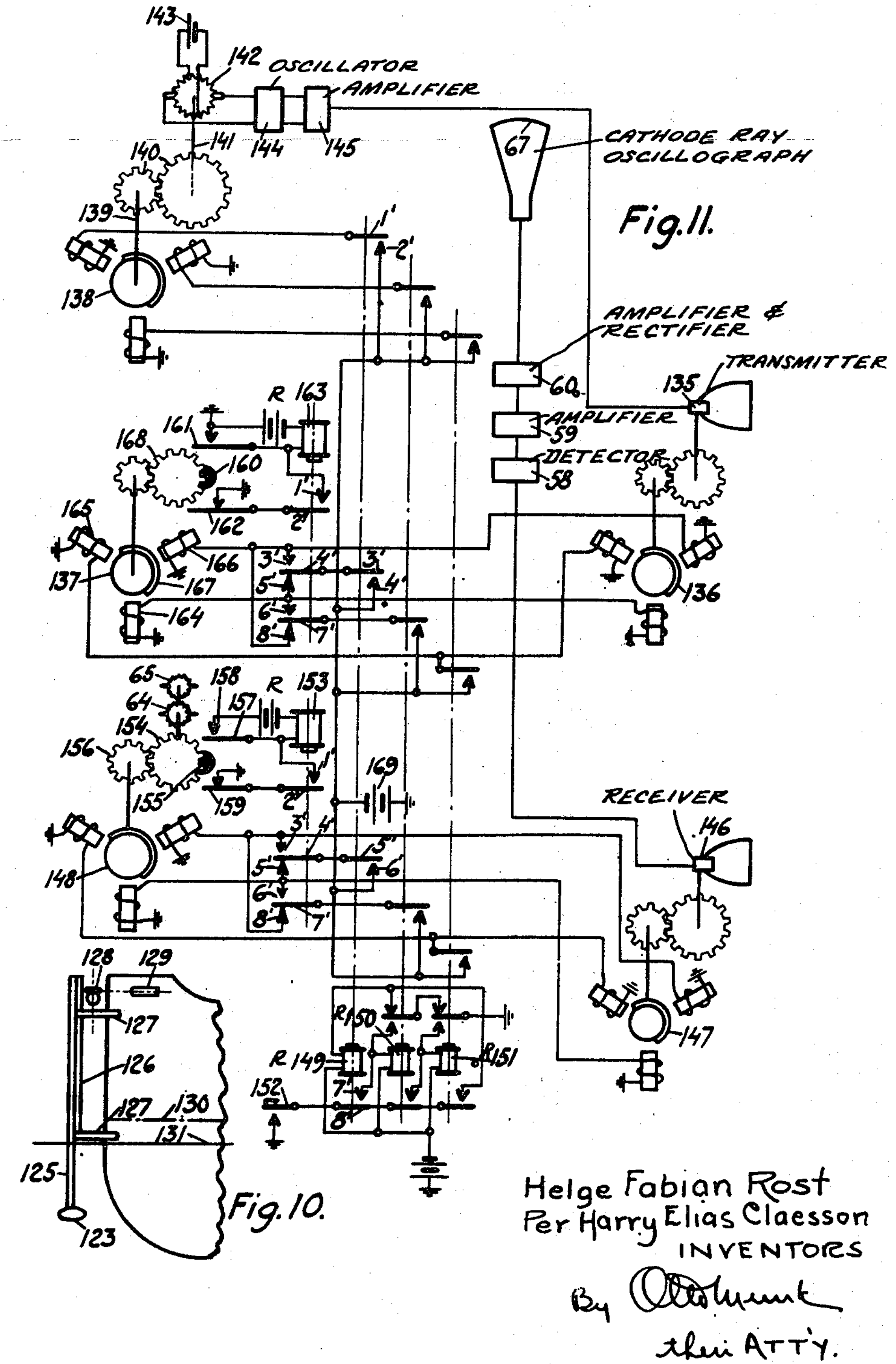
Fig. 10 is a side view of a transmitting and/or receiving device mounted in the bow of a ship.
Fig. 11 shows schematically another and preferred embodiment of the invention.

Figs. 8, 9 and 10 thus show another arrangement of transmitting and receiving instruments intended to be mounted at the bow of a ship, whereby the transmitter and receiver are enclosed in watertight shells to be lowered in or raised out of the water at will, there being no necessity of docking a ship or to perforate the hull for the installation of the equipment. 123 is a streamlined shell to be submerged in the water. 132 is a window membrane to let through the directed pressure waves from the corresponding reflector. 124 is a sector mounted inside the shell 123, there being an air cushion between the sector 124 and the shell 123, both having the common window membrane 132. Inside the sector there is mounted the transmitter or the receiver 133, provided with a parabolic reflector which can swing back and forth around the center or shaft 134. The sector 124 is filled with, for example, oil and the transmitter or receiver and its reflector is entirely submerged in the oil in which it can swing back and forth for continuous scanning, the transmitted or received waves passing from or to the vibrating surface of transmitter or receiver 133 and window 132 to the outside water. The transmitter or receiver 133 with its reflector can be driven by a motor mounted in the air compartment between the sector 124 and outside shell 123. A gear drive can be interconnected between the motor and the shaft as shown in transmitter 135 and receiver 146, Fig. 11, so as to obtain the correct speed of the transmitter or of the receiver.

Instead of scanning in a horizontal direction the shell 123 can be made to scan in any plane between the horizontal and the vertical planes downwards, simply by changing the angle between the shell 123 and the column 125, Fig. 10, to which shell 123 can be movably attached in known way. The column 125 can be raised or lowered in the water by means of a gear drive 128 operated by motor 129 mounted in the ship. 126 is a permanent rack to guide column 125 and to fix its position in the water. 127 are supports for attaching the device to the ship's hull. The device can be preferably mounted on the hull when the ship is empty, or when the water line 131 is low. When loaded, the ship's waterline is raised to the line 130 shown on the drawing. By this arrangement there is no need to lose time by docking or to perforate the bottom of the ship. By locating the scanning device ahead of the ship, undesirable obstacles such as floating mines or mines located on the sea bottom can be detected and marked on a fluorescent screen on board the ship, before the ship eventually gets too close to a dangerous obstacle.

By transmitting powerful supersonic waves of a certain frequency in a direction of, for example, 45° from the horizontal, the device might be used to make mines deposited in the sea explode at a safe distance from the ship. This performance should be possible with the new kind of mines lately introduced.

In Fig. 11, 135 is a pressure wave transmitter. It is driven by means of a gear drive at suitable speed by motor 136, and which in its turn is synchronously driven with motor 137. Motor 136 can be located in a separate shell like 123 (Figs. 8–10) and motor 137 conveniently located at the bridge or at any other suitable place on board the ship, both motors being driven synchronously in known manner, for example by a step-by-step mechanism, consisting of 3 relays R149, R150 and R151. 152 is a key to start and stop the operation of the relays R150 and R151 and thus also the corresponding motors.

The transmitter is given a back and forth scanning motion by means of a cam 160 attached to cogwheel 168 on a shaft gear driven at suitable speed by motor 137. In one extreme position the cam 160 actuates a contact spring 161 closing an operating circuit of relay R163 which then receives holding current over its contacts 1'—2'. In the other extreme position cam 160 breaks the contact of spring 162 to ground, thus interrupting the holding current of relay R163. By this operation relay R163 is deenergized and its contact springs 4' and 7' change the sequence of current pulses from the said stepping relays to the motors 136 and 137, so that the reflector of the transmitter is given a back and forth scanning motion over a certain predetermined sector.

146 is a pressure wave receiver enclosed in a shell similar to that shown in Figs. 8–10 (123). It is rotatable by a gear coupled to motor 147 at a speed considerably higher than that of the transmitter 135 and in a manner similar to that just described for said transmitter.

The motor 147 runs synchronously with motor 148 which latter one is installed at the bridge or another suitable place in the ship. The receiver is connected to a detector 58, an amplifier 59, and an amplifier and rectifier 60. 67 is a cathode ray tube provided with a fluorescent sceen in the same way as shown in Fig. 2. The cathode ray is operated in exactly the same way as shown in Fig. 2. Potentiometers (the connections of which are not shown) corresponding to potentiometers 64 and 65, Fig. 2 are mounted on the same shaft as cogwheel 154 so as to direct the ray of cathode ray tube in the same manner as already shown in Fig. 2.

138 is a motor driven synchronously with all the other motors and drives a frequency modulating device in the form of a potentiometer 142 and a current source 143, which operate in a manner similar to that of potentiometer 16 and current source connected thereto as shown in Fig. 1. The potentiometer 142 is mounted on a shaft 141, slowly driven by said motor 138 at a speed to suit the desired frequency modulation. 144 is an oscillator coupled to said frequency modulating device and 145 is an amplifier for amplifying the frequency modulated current delivered by the oscillator 144. Said amplifier is connected to a magnetostriction pressure wave transmitter 135.

The device according to Fig. 11 makes it possible to conveniently control and drive the transmitter and receiver and register the obtained results at any desired place on board the ship by electric synchronous drive.

By continuously rotating the transmitter and the receiver, it is possible to locate all submerged objects ahead or at the side of the course of a ship and they can be observed at the same time on a fluorescent screen.

The invention is not limited to the described figures which only show a few applications of the invention. and it is clearly understood that the general inventive idea of simultaneous visual indication of direction and distance of invisible subaqueous objects at a certain place by means of transmitted and received reflected subaqueous frequency modulated pressure waves from said objects is not limited to the shown horizontal scanning direction. The invention can also be used in a vertical or any intermediate direction.

Having now particularly described and ascertained the nature of our said invention and in what manner the same is to be performed, we declare that what we claim is:

1. A method of sound ranging in sectors of given depths which consists in rotating a beam of compressional waves through the sector being searched, rotating a directive receiver after a definite interval through the same sector to pick up reflected waves returning from objects situated in said sectors, receiving the echoes of the beam with the directive receiver and thereby determining the direction and distance of the reflecting object.

2. In a system for the determination of angular bearings and distances of objects in a liquid medium from an origin in said medium, a transmitter of broad frequency curve to transmit pressure waves of varying frequency from the origin, a pressure wave receiver of broad frequency curve at the origin to receive echos of said transmitted waves reflected from a distant object, said transmitter and receiver being directional and rotatable about a given axis at said origin, means for producing rotation of said rotatable transmitter and receiver about said axis, means for comparing the frequency of the received waves with that of the waves transmitted to produce a beat frequency proportional to the distance to said reflecting object from said origin, an indicator having an indicating area and means controlled in part by said received beat frequency for producing a localized indication within said area, said indication producing means including means for rotating the angular position of said localized indication about the center of said area and in synchronism with the rotation of said rotatable receiver together with the frequency sensitive means controlled by said beat frequency for fixing the radial distance of said localized indication from the center of said indicating area in accordance with the said beat frequency.

3. The system claimed in claim 2, in which the transmitter is rotatable about one axis and the receiver is rotatable about another axis, means being provided for rotating the receiver at a speed higher than that of the transmitter.

4. The system claimed in claim 2, in which the indicator is a cathode ray oscillograph provided with a fluorescent screen.

5. The system claimed in claim 2, in which the indicator is a cathode ray oscillograph comprising electrical deviation means, means connected to the receiver for producing a potential for deviating the ray of the oscillograph upon the arrival of a reflected wave, said means for rotating the angular position of the indication including a shaft, circular potentiometers and corresponding brushes concentrically arranged around said shaft, said circular potentiometers being interconnected between said potential producing means and said electrical deviating means to radially deviate said ray from its normal position in the direction of a reflecting object.

HELGE FABIAN ROST.
PER HARRY ELIAS CLAESSON.

REFERENCES CITED

The following references are of record in the file of this patent:

UNITED STATES PATENTS

| Number | Name | Date |
|---|---|---|
| 1,501,105 | Fessenden | July 15, 1924 |
| 1,836,397 | Rieber | Dec. 15, 1931 |
| 1,972,889 | Hayes | Sept. 11, 1934 |
| 2,064,911 | Hayes | Dec. 22, 1936 |
| 2,130,912 | Tolson | Sept. 20, 1938 |
| 2,151,917 | Hyland | Mar. 20, 1939 |
| 2,166,991 | Guanella | July 25, 1939 |
| 2,172,395 | McSpadden | Sept. 12, 1939 |
| 2,206,903 | Lane et al. | July 9, 1940 |
| 2,410,066 | Harrison | Oct. 29, 1946 |
| 2,410,067 | Harrison | Oct. 29, 1946 |
| 2,447,333 | Hayes | Aug. 17, 1948 |